(12) United States Patent
Mercx

(10) Patent No.: US 9,175,146 B2
(45) Date of Patent: Nov. 3, 2015

(54) THERMAL CONDUCTIVE POLYMERIC PTC COMPOSITIONS

(75) Inventor: Franciscus Petrus Maria Mercx, Bergen op Zoom (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 11/833,771

(22) Filed: Aug. 3, 2007

(65) Prior Publication Data

US 2008/0039575 A1 Feb. 14, 2008

Related U.S. Application Data

(60) Provisional application No. 60/821,751, filed on Aug. 8, 2006.

(51) Int. Cl.
*C08K 3/04* (2006.01)

(52) U.S. Cl.
CPC ............. *C08K 3/04* (2013.01); *C08K 2201/014* (2013.01)

(58) Field of Classification Search
CPC .......................... C08K 3/04; C08K 2201/014
USPC .................................................. 524/495, 496
See application file for complete search history.

(56) References Cited

U.S. PATENT DOCUMENTS

| 4,957,723 | A | 9/1990 | Nishino |
|---|---|---|---|
| 5,178,797 | A * | 1/1993 | Evans ........................... 252/508 |
| 5,571,950 | A | 11/1996 | Waddoups et al. |
| 5,837,164 | A | 11/1998 | Zhao |
| 5,985,182 | A | 11/1999 | Zhao |
| 2005/0112441 | A1 * | 5/2005 | Iino et al. ........................ 429/34 |
| 2006/0027790 | A1 * | 2/2006 | Arai et al. ..................... 252/500 |

FOREIGN PATENT DOCUMENTS

| EP | 1001436 A2 | 5/2000 |
|---|---|---|
| EP | 1001436 A3 | 5/2000 |
| JP | 08165388 A1 | 12/1994 |
| JP | 2000159951 A1 | 11/1998 |

OTHER PUBLICATIONS

International Search Report for PCT/US2007/075234 International Filing Date Jun. 8, 2007; Mailing Date Dec. 18, 2007 (5 pages).
Written Opinion of the International Searching Authority for PCT/US2007/075234 International Filing Date Jun. 8, 2007; Mailing Date Dec. 18, 2007 (6 pages).
TW Search Report for Application No. 096129239 Issued Aug. 12, 2013 (1 page).
JP 1-095168A Apr. 13, 1989 Patent Abstracts of Japan; 1 page (Abstract only).
JP 60-031540A Feb. 18, 1985 Patent Abstracts of Japan; 1 page (Abstract only).
JP 7-258376A; Oct. 9, 1995 Patent Abstracts of Japan; 1 page (Abstract only).

* cited by examiner

*Primary Examiner* — Peter D Mulcahy
(74) *Attorney, Agent, or Firm* — Cantor Colburn LLP

(57) ABSTRACT

A positive temperature coefficient (PTC) composition that has improved thermal conductivity and that includes a thermoplastic polymer, carbon black and graphite. The compositions offer improved thermal conductivity and/or rheology of the PTC composition as compared to compositions that do not include graphite, or that use smaller graphite particles. The compositions may also include one or more additives. The PTC compositions of the present invention offer improved thermal conductivity at most any temperature and permit PTC materials to be designed that can be tailored to operate at different temperatures based upon the thermoplastic polymer used.

16 Claims, No Drawings

THERMAL CONDUCTIVE POLYMERIC PTC COMPOSITIONS

CROSS REFERENCE TO RELATED APPLICATIONS

This application claims priority to U.S. Provisional Application No. 60/821,751, which was filed Aug. 8, 2006.

FIELD OF INVENTION

The present invention relates to positive temperature coefficient compositions, articles of manufacture that include a positive temperature coefficient composition, and methods of making articles that include a positive temperature coefficient composition.

BACKGROUND OF INVENTION

In recent years, positive temperature coefficient (PTC) polymer materials have been widely applied to self limiting heating cables, over-current protection devices e.g. thermistors, touch-control elements, and the like. Due to the extensive development, application and dissemination of electronic products, such as computers and peripheral equipments thereof, cellular phones, secondary rechargeable batteries, network interface boards/machines, modems and electronic facilities and so on, the need for over-current protection devices has remarkably increased. Particularly, the trend for present electronic products is to be light and/or accurate, and the characteristics of an over-current protection device made from PTC polymer materials are being utilized to help meet this trend.

PTC materials are conductive materials characterized by a sharp increase in resistivity upon reaching a switching temperature (Ts). If the jump in resistivity is sufficiently high, the resistivity effectively blocks the current and further heating of the material such that overheating of the material is prevented. One of the main benefits of PTC materials is that no additional electronic circuits are necessary in an article that includes a PTC material since the PTC material itself has a characteristic similar to electronic circuits. Moreover, upon cooling, the material resets itself. This jump in resistivity may oftentimes be referred to as the PTC amplitude and may be defined as the ratio of the maximum volume resistivity to the volume resistivity at room temperature (app. 23° C.). In many prior art embodiments, PTC polymer materials primarily have been prepared by the addition of conductive additives, such as carbon black and metal powders, to polymer materials. Crosslinking of a conductive polymer by chemicals or irradiation, or the addition of inorganic fillers or organic additives may also be employed to improve electrical stability.

As mentioned, carbon black is one material that has been used in PTC materials. Carbon black is one of the most frequently used conductive fillers for polymer based PTC materials. Some of the advantages of using carbon black as compared to conductive metal fillers include a lower cost price and a lower density. According to the prior art, medium-sized, low-structured carbon blacks yield PTC materials with a good balance between conductivity and PTC amplitude. Typically these carbon black based polymeric PTC materials are employed in circuit breakers and (resettable) fuses. Nevertheless, the use of these PTC materials as true heaters is limited due to the limited thermal conductivity of the "pure" carbon black based polymeric PTCs. Any heater needs to transfer the heat generated to another medium. The higher the thermal conductivity the better the heat transfer to the outside/the medium that is desired to be heated up.

In one prior art embodiment, carbon black is used to provide thermal conductivity. According to some prior art teachings, medium sized low-structured carbon blacks yield PTC materials with a good balance between conductivity and PTC amplitude. Typically these carbon black-based polymeric PTC materials are employed in circuit breakers and (resettable) fuses. Nevertheless, the use as of these PTC materials as true heaters is limited due to the limited thermal conductivity of "pure" carbon black-based polymeric PTCs. Heaters based on these PTC materials need to transfer the heat generated to another medium. The higher the thermal conductivity, the higher the heat transfer to the outside/another medium and the more effective the heater. In addition, a better heat conductivity can prevent or smoothen hot spots that can occur when the cross section of a material between the electrodes changes.

Alternative prior art embodiments utilize small graphite particles (i.e. having an average diameter less than 10 microns) as a conductive filler in PTC materials. However, small diameter graphite particles are more expensive due to the costs associated with making these small particles and the use of such small particles also is more difficult in a manufacturing environment due to health and environmental safety issues.

Accordingly, as may be seen, it would be beneficial to provide a PTC material that has improved thermal conductivity as compared to prior art PTC materials without the disadvantages associated with prior art materials.

SUMMARY OF THE INVENTION

The present invention addresses the issues associated with the prior art by providing a positive temperature coefficient (PTC) material that has improved thermal conductivity. The compositions of the present invention include a thermoplastic polymer, carbon black and graphite in an amount that improves the thermal conductivity of the PTC composition as compared to compositions that do not include graphite. The graphite is a larger particle size material (i.e. greater than 10 microns in average diameter) to help lower the cost of the filler as well as increase the ease of use in a manufacturing environment. The compositions of the present invention may also include one or more additives to improve select characteristics of the PTC compositions such that they may be used in a wide variety of applications. The PTC compositions of the present invention offer improved thermal conductivity at most any temperature and permit PTC materials to be designed that can be tailored to operate at different temperatures based upon the thermoplastic polymer used and/or the amounts of carbon black and/or graphite that are used.

Accordingly, in one aspect, the present invention provides a positive temperature coefficient material having from 30 to 90% by weight of a semi-crystalline thermoplastic polymer having a degree of crystallinity of at least 5%; from 5 to 50% by weight carbon black; and from 5 to 50% by weight graphite having a carbon content of at least 99% and a particle size of at least 10 microns. The positive temperature coefficient composition has an improved thermal conductivity as compared to a composition consisting of the thermoplastic polymer and the carbon black.

In another aspect, the present invention provides an article including a positive temperature coefficient material having from 30 to 90% by weight of a semi-crystalline thermoplastic polymer having a degree of crystallinity of at least 5%; from 5 to 50% by weight carbon black; and from 5 to 50% by weight graphite having a carbon content of at least 99% and a particle size of at least 10 microns. The positive temperature coefficient composition has an improved thermal conductivity as compared to a composition consisting of the thermoplastic polymer and the carbon black.

In still another aspect, the present invention provides a positive temperature coefficient material having from 30 to 90% by weight of a semi-crystalline thermoplastic polymer having a degree of crystallinity of at least 5%; from 5 to 50% by weight carbon black; and from 5 to 50% by weight graphite having a carbon content of at least 99% and a d90 particle size of at least 10 microns. The positive temperature coefficient composition has an improved thermal conductivity as compared to a composition consisting of the thermoplastic polymer and the carbon black.

In yet another aspect, the present invention provides an article including a positive temperature coefficient material having from 30 to 90% by weight of a semi-crystalline thermoplastic polymer having a degree of crystallinity of at least 5%; from 5 to 50% by weight carbon black; and from 5 to 50% by weight graphite having a carbon content of at least 99% and a d90 particle size of at least 10 microns. The positive temperature coefficient composition has an improved thermal conductivity as compared to a composition consisting of the thermoplastic polymer and the carbon black.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides positive temperature coefficient (PTC) materials, articles of manufacture that include one or more positive temperature coefficient materials, and methods of making articles that include one or more positive temperature coefficient materials. The PTC materials of the present invention have improved thermal conductivity and/or rheology as compared to prior art PTC materials. As a result, the heat generated within the material is transferred more quickly throughout the material as well as to any outside medium improving the effectiveness of the PTC materials as a heater. In addition, hotspots wherein a portion of the device is much hotter than another portion can be reduced and/or eliminated through the use of the materials of the present invention. The improved rheology indicates that these compositions have a higher flow rate and are, therefore, easier to process than prior art PTC materials.

Due to the improved thermal conductivity and/or heat-transfer, the formulations of the present invention, which contain a sufficient amount of graphite, show a smaller delta in temperature between the internal PTC temperature and the surface temperature of the PTC materials compared to a carbon black-based PTC material, when operated in a steady state mode. As such, initially, the material will heat up quickly after been connected to this power source and eventually reaches an equilibrium temperature (which may also be defined as the operating temperature), where the heat generated is substantially equal to the heat lost and the temperature remains substantially constant over time. In addition, prior art PTC materials utilizing only carbon black tend to overshoot the trip temperature before leveling out at the trip temperature. As such, this spike in temperature may harm the underlying materials.

Conversely, the materials of the present invention do not overshoot the selected trip temperature, but simply level out when the trip temperature is reached, thereby avoiding the negatives associated with the temperature overshoot. In addition, the use of graphite helps to increase the heat deformation temperature of the material, thereby enabling the PTC material to be used in more structural applications that may be subjected to greater forces. Since the materials deform at higher temperatures, the PTC materials of the present invention are less likely to deform during use.

The PTC materials of the present invention achieve one or more of the characteristics described through the use of a PTC composition that includes a thermoplastic material, carbon black, and larger particle size graphite. The compositions of the present invention utilize a sufficient amount of carbon black and graphite to provide electrical conductivity to the thermoplastic material while also acting as a resistor as the temperature of the material reaches a select switching temperature. Based upon one or more factors including, but not limited to, the thermoplastic used, the amount of carbon black used, the size of the graphite particles and/or the amount of graphite used, the PTC compositions of the present invention have improved thermal conductivities as compared to prior art PTC compositions that include only carbon black or smaller graphite particles.

As used herein, "smaller" graphite particles are those having an average diameter of less than 10 microns. As discussed, these particles, while increasing thermal conductivity, are expensive to produce and more difficult to compound due to the size of the materials.

Unexpectedly, however, it has been found that "larger" graphite particles, i.e. those having an average diameter greater than 10 microns, while being less expensive to produce and easier to compound, actually provide an even greater increase in the thermal conductivity. Since the same weight percent of larger particles has a lower surface area than the same weight of smaller particles, it would have been thought that the larger surface area from the smaller particles would have helped increase thermal conductivity of a composition more than lesser surface area of the larger particles. As set forth in the examples, however, it was determined that this was not the case.

As such, in one embodiment, the compositions of the present invention include larger particle size graphite particles. In one embodiment, the graphite particles used in the compositions of the present invention have an average particle size of 10 microns or greater. In another embodiment, the graphite particles used in the compositions of the present invention have an average particle size between 10 microns and 300 microns. In still another embodiment, the graphite particles used in the compositions of the present invention have an average particle size between 10 microns and 150 microns.

In addition, the compositions of the present invention can also use graphite particles with different size diameters. As such, in yet another embodiment, the graphite particles used in the compositions of the present invention have a d90 particle size of 10 microns or greater. In still another embodiment, the graphite particles used in the compositions of the present invention have a d90 particle size of between 10 microns and 150 microns. In yet another embodiment, the graphite particles used in the compositions of the present invention have a d90 particle size of between 15 microns and 75 microns. As used herein, a "d90 particle size" means that 90% of the particles have a diameter equal to or less than the stated diameter. Accordingly, a d90 of 25 microns indicates that 90% of the graphite particles have a diameter equal to or less than 25 microns. In addition, a d90 particle size of a given range indicates that the graphite particles where the upper limit of the range indicates the d90 particle size above while the lower limit indicates that the graphite material has been sieved such that all particles smaller than the lower limit have been removed. For example, a d90 between 15 microns and 75 microns indicates that 90% of the graphite particles have a diameter less than 75 microns and that all particles having a diameter less than 15 microns have been removed.

In addition to the size of the graphite particles, it is beneficial for the graphite particles to have a high percentage of carbon. Accordingly, in one embodiment, the graphite has a carbon content of at least 99%. In another embodiment, the graphite has a carbon content of at least 99.5%.

As stated, the PTC compositions of the present invention show an increase in thermal conductivity as compared to PTC materials that do not include carbon black and graphite. These increases in thermal conductivity are exhibited as compared to compositions that include the same total amount of carbon black only such that the use of carbon black and graphite provides a synergistic improvement even though the compositions have the same amount of conductive material.

The compositions of the present invention achieve these improved thermal conductivities by adding a mixture of carbon black and graphite to a thermoplastic material to form the PTC material. The amount of graphite in the composition is, in one embodiment, from 5 to 50% by weight of the total weight of the PTC composition. In another embodiment, the amount of graphite in the PTC composition is from 15 to 45% by weight of the total weight of the PTC composition. In still another embodiment, the amount of graphite in the PTC composition is from 20 to 40% by weight of the total weight of the PTC composition.

The amount of carbon black in the composition is, in one embodiment, from 5 to 50% by weight of the total weight of the PTC composition. In another embodiment, the amount of carbon black in the PTC composition is from 10 to 45% by weight of the total weight of the PTC composition. In still another embodiment, the amount of carbon black in the PTC composition is from 15 to 40% by weight of the total weight of the PTC composition. In addition, the carbon blacks used in the present invention may have a dibutylphthalate absorption (DBP) of less than 250 ml/100 g. In another embodiment, the carbon blacks used in the present invention may have a dibutylphthalate absorption of less than 200 ml/100 g. In still another embodiment, the carbon blacks used in the present invention may have a dibutylphthalate absorption of less than 150 ml/100 g.

The present invention utilizes both carbon black and graphite since this combination provides better thermal conductivity than compositions using only carbon black or only graphite. In addition, it has also been found that the combination of carbon black and graphite also increases the rheology or flow properties of the compositions of the present invention as compared to compositions having only carbon black or only graphite. As such, the compositions of the present invention are easier to process than prior art compositions. The amount of carbon black in the PTC compositions of the present invention may be based such that the total amount of carbon black and graphite is from 10 to 70% by weight of the total weight of the PTC composition, such that the amount of the thermoplastic polymer is from 90 to 30% by weight of the total weight of the PTC composition. In an alternative embodiment, the total amount of carbon black and graphite is from 30 to 60% by weight of the total weight of the PTC composition, such that the amount of the thermoplastic polymer is from 70 to 40% by weight of the total weight of the PTC composition. In still another alternative embodiment, the total amount of carbon black and graphite is from 40 to 60% by weight of the total weight of the PTC composition, such that the amount of the thermoplastic polymer is from 60 to 40% by weight of the total weight of the PTC composition.

The carbon black and graphite may be used with any thermoplastic material capable of being used to form a PTC material. In one embodiment, the thermoplastic material is a semi-crystalline material since it can be easier to obtain PTC characteristics in a semi-crystalline material as compared to amorphous thermoplastic materials. In one embodiment, the semi-crystalline thermoplastic material has a degree of crystallinity of at least 5%. In another embodiment, the semi-crystalline thermoplastic material has a degree of crystallinity of at least 10%. In still another embodiment, the semi-crystalline thermoplastic material has a degree of crystallinity of at least 15%. The term "semi-crystalline" refers to thermoplastic materials that have a degree of crystallinity sufficient to cause their behavior to exhibit substantial, but not full, crystalline thermoplastic behavior.

Examples of thermoplastic polymers that may be used in the present invention include, but are not limited to, polyethylene (PE), including high-density polyethylene (HDPE), linear low-density polyethylene LLDPE, low-density polyethylene (LDPE), mid-density polyethylene (MDPE), maleic anhydride functionalized polyethylene, maleic anhydride functionalized elastomeric ethylene copolymers (like EXXELOR VA1801 and VA1803 from ExxonMobil), ethylene-butene copolymers, ethylene-octene copolymers, ethylene-acrylate copolymers like ethylene-methyl acrylate, ethyelene-ethyl acrylate and ethylene butyl acrylate copolymers, glycidyl methacrylate modified polyethylene, polypropylene (PP), maleic anhydride functionalized polypropylene, glycidyl methacrylate modified polypropylene, polyvinyl chloride (PVC), polyvinyl acetate, polyvinyl acetyl, acrylic resin, syndiotactic polystyrene (sPS), polyamides, including but not limited to PA6, PA66, PA11, PA12, PA6T, PA9T, poly-tetra-fluorethylene (PTFE), polybutylene-terephthalate (PBT), polyphenylene-sulfide (PPS), polyamideimide, polyimide, Polyethylene vinyl acetate (EVA), glycidyl methacrylate modified polyethylene vinyl acetate, Polyvinylalcohol, poly(methyl methacrylate) (PMMA), polyisobutylene, poly(vinylidene chloride), poly(vinylidene fluoride) (PVDF), poly(methylacrylate), polyacrylonitrile, polybutadiene, polyethylene-terephthalate (PET), poly(8-aminocaprylic acid), poly(vinyl alcohol) (PVA), polycaprolactone, or blends, mixtures or combinations of one or more of these polymers. In beneficial embodiments of the present invention, the thermoplastic polymer is a polyethylene polymer, such as high-density polyethylene. As used herein, a "high-density polyethylene" has a density greater than 0.94 g/cm$^3$. Thermosets can also be used, but most embodiments utilize thermoplastic material. In some embodiments, a thermoplastic material is used and is cross-linked after molding.

In addition, the PTC compositions of the present invention may include one or more additives. The additive may include, but are not limited to, fillers, antioxidants, lubricants, flame retardants, nucleating agents, coupling agents, ultraviolet absorbers, ultraviolet stabilizers, pigments, dyes, plasticizers, processing aids, viscosity control agents, tackifiers, anti-blocking agents, surfactants, extender oils, metal deactivators, voltage stabilizers, boosters, catalysts, smoke suppressants and the like, or a combination containing at least one of the foregoing, depending on the final desired characteristics of the PTC material. Examples of additives, fillers and the like that may be used in the present invention include, but are not limited to, glass fibers, mineral fillers, and the like, or a combination containing at least one of the foregoing.

Examples of nucleating agents include, but are not limited to, talc, silica, mica, kaolin, sorbitol, sodium benzoate, sodium stearate, and the like, or a combination containing at least one of the foregoing.

Examples of antioxidants include, but are not limited to, hindered phenols such tetrakis[methylene(3,5-di-t-butyl-4-hydroxyhydrocinnamate)]-methane, 4,4'-thiobis(2-methyl-6-tert-butylphenol), and thiodiethylene bis(3,5-di-tert-butyl-4-hydroxy)hydrocinnamate, octadecyl-3 (3,5-di-tert.butyl-4-hydroxyphenyl)proprionate, pentaerythritol tetrakis(3(3,5-di-tert.butyl-4-hydroxyphenyl)proprionate), phosphites and phosphonites such as tris(2,4-di-tert-butylphenyl)phosphite and thio compounds such as dilaurylthiodipropionate, dimyristylthiodipropionate, and distearylthiodipropionate, potassium iodide, cuprous iodide, various siloxanes, and amines such as polymerized 2,2,4-trimethyl-1,2-dihydroquinoline and the like, or a combination containing at least one of the foregoing.

Examples of flame retardants include, but are not limited to, halogenated flame retardants, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis(tetrabromophthalimide), bis(pentabromobenzyl)ethane, metal hydroxides like Mg(OH)2 and Al(OH)3, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl) sulfanylimide potassium salt, or a combination containing at least one of the foregoing. Fillers and additives may be added in amounts ranging from 0.1 to about 40% by weight percent of the total PTC composition.

In addition, while the compositions of the present invention are described as being formed with carbon black and graphite, it is to be understood that other crystalline or amorphous carbon materials such as vitreous carbon, activated charcoal, activated carbon, carbon fiber or the like may be used in alternative embodiments. The other crystalline or amorphous carbon materials may, in one embodiment, be used in lieu of the carbon black or, in an alternative embodiment, may be used in conjunction with the carbon black and the graphite.

Also, it is to be understood that the concepts of the present invention may be used in any article in which one or more benefits of the PTC materials may be utilized. For example, the PTC materials of the present invention may be used in self-controlled heaters, overcurrent protection devices, air conditioning units, automotive applications, such as heated seats, heated mirrors, heated windows, heated steering wheels, and the like, circuit protection devices, perfume dispensers and any other application in which a thermoplastic-based PTC material may be used.

The preparation of the PTC compositions may be achieved by blending the ingredients under conditions for the formation of an intimate blend. All of the ingredients may be added initially to the processing system, or else certain additives may be precompounded. The blend may be formed by mixing in single or twin screw type extruders or similar mixing devices that can apply a shear to the components, for example Bush co-kneaders, Banbury mixers and Brabender mixers or an injection molding compounding (IMC) process.

In one embodiment, separate extruders are used in the processing of the blend. In another embodiment, the composition is prepared by using a single extruder having multiple feed ports along its length to accommodate the addition of the various components. A vacuum may be applied to the melt through at least one or more vent ports in the extruder to remove volatile impurities in the composition. In one of the embodiments it may be advantageous to feed the graphite particles downstream to have an as large as possible graphite particle size in the resulting compound.

All cited patents, patent applications, and other references are incorporated herein by reference in their entirety. The invention is further illustrated by the following non-limiting examples.

EXAMPLES

Table 1 shows three examples of PTC materials of the present invention and the improved conductivity of these materials as compared to a PTC material that does not include both carbon black and graphite (or thermo-conductive black). In these Examples, the high-density polyethylene used was Basell GD7255. The carbon black was Printex G from Degussa and the graphite was Ashbury TC300 having a d50 of 180 microns. As used herein, d50 means that 50 wt % of the particles are <180 microns). The PTC materials were compounded on a Werner and Pfleiderer 25 mm co-rotating 10-barrel twin-screw extruder. All ingredients were fed at the throat. The intake zone was set at 50° C. and the first heating element at 150° C. The other heating elements as well as the die were set at 190° C. Typically all compositions were compounded at a screw speed of 300 rpm, the throughput was tuned in order to reach a torque of between 70 and 80 percent.

After pre-drying for 4 hrs at 80° C., the compositions were injection molded using on an Engel 75 using the following settings—hopper at 50° C., $1^{st}$ zone set at 225° C., $2^{nd}$ zone at 235° C., $3^{rd}$ zone set at 245° C. and the die at 240° C. with a mold temperature of 60° C. The compositions were formed into ISO-tensile bars that were then used to determine the PTC characteristics of the given composition.

The PTC characteristics were measured using a "static test". Samples for the static test were prepared as follow: the ISO-tensile bars were notched at the inclination point, cooled to −40° C. and broken, after which silver paint was applied. In the static test, a temperature was forced upon the material and the resulting resistivity was measured. The oven temperature was raised in steps of ~20° C. prior to the onset of the PTC effect and in steps of 5-10° C. just before and after the onset. Only around the PTC temperature did large changes of the resistivity vs. the temperature occur. As such initially larger incremental steps in temperature were employed which, upon nearing the PTC temperature, were reduced and increased after the PTC effect had occurred. To ensure a homogeneous well-through heated sample, a conditioning time of 40 min was applied after each stepwise raise in temperature. Two different methods were employed to measure the resistance of the samples. For samples 1-4, the resistance was measured immediately after opening of the oven, without removing the sample from the oven. This measurement was completed within a few seconds. Samples 5-17 below were measured using a special designed sample holder, allowing the samples to remain in the closed oven and measure the resistance of the samples outside the oven.

The effective specific volume resistivity (SVR) was calculated according to:

$$SVR(Ohm \cdot cm) = \frac{Resistance\,(Ohm) * Fracture\,area\,(cm \wedge 2)}{Length\,of\,sample\,(electrode\,distance)\,(cm)}$$

R135/R23 was used as a measure for the magnitude of the PTC effect, were R135 denotes the resistivity at 135° C. and R23 the room temperature resistivity.

The trip temperature was characterized as the onset temperature where the sharp increase in resistivity was observed in a temperature vs. the Logarithmic volume resistivity plot. This onset temperature was determined by the intersection of the tangents drawn at 50° C. and the steepest part of the resistivity curve.

Thermal conductivity was measured using a Netzsch LFA 447 laserflash apparatus, using injection molded 2 mm thick discs of 12 mm diameter.

Heat deflection temperature or heat distortion temperature (referred to as "HDT") is a measure of the heat deflection temperature under a load and was measured in accordance with procedure defined by ISO 75/Be.

Melt Volume Rate is a measure of the viscosity of the material and was measured in accordance with ISO 1133.

Sample 1 was the control sample and included 50 wt % HDPE and 50 wt % carbon black. Samples 2 and 3 show PTC materials that included both graphite and carbon black, with sample 2 having 20% graphite and 50% total, by weight, of carbon black and graphite, sample 3 included 25% graphite and 50% total, by weight, of carbon black and graphite, and sample 4 included 30% graphite and 55% total, by weight, of carbon black and graphite.

As may be seen from the data, the compositions made according to the concepts of the present invention had higher heat deformation temperatures, thereby enabling the materials to have greater utility in any structural application and improved thermal conductivities as compared to prior art PTC materials that included only carbon black.

In addition, as may be seen, the compositions of the present invention have a much higher MVR such that these compositions have a higher flow rate and are, therefore, easier to process than a composition that only includes HDPE and carbon black.

TABLE 1

|  | unit | Formulation | | | |
| --- | --- | --- | --- | --- | --- |
|  |  | #1 | #2 | #3 | #4 |
| HDPE[1] |  | 50 | 50 | 50 | 45 |
| C-black[2] |  | 50 | 30 | 25 | 25 |
| Graphite[3] |  |  | 20 | 25 | 30 |
| Total |  | 100 | 100 | 100 | 100 |
| Properties |  |  |  |  |  |
| Rheology |  |  |  |  |  |
| MVR (265° C./10 kg) | ml/10 min | 1 | 11 | 15 | 11 |
| Thermal |  |  |  |  |  |
| HDT (0.45 Mpa) | ° C. | 102 | 110 | 110 | 113 |
| Thermal conductivity at 25° C. | W/mK | 0.45 | 0.71 | 0.76 | 0.93 |
| PTC-characteristics |  |  |  |  |  |
| RT resistivity | Ohm · cm | 0.86 | 2.64 | 7.03 | 3.85 |
| $R_{135}/R_{23}$ |  | 1763 | 4660 | 5109 | 15455 |
| Trip temperature | ° C. | 125 | 124 | 123 | 123 |

[1]Basell GD7255 was used
[2]Printex G from Degussa
[3]TC300 from Ashbury (d50 = 180 micron)

In Examples 5-17, the PTC formulations were manufactured on a Coperion 25 mm co-rotating twin-screw extruder. The HDPE was fed at the throat and the C-black at section 4 whereas the graphite was added at section 6. The intake zone was set at 50° C. and the first heating element at 150° C. The other heating elements as well as the die were set at 190° C. Typically all compositions were compounded at a screw speed of 300 rpm, the throughput was tuned in order to reach a torque of between 70 and 80 percent. Injection molding was performed as set forth in Examples 1-4.

TABLE 2

| Formulation | | #5 | #6 | #7 | #8 | #9 | #10 | #11 | #12 | #13 | #14 | #15 | #16 | #17 |
| --- | --- | --- | --- | --- | --- | --- | --- | --- | --- | --- | --- | --- | --- | --- |
| HDPE[1] |  | 55 | 57.5 | 60 | 55 | 57.5 | 60 | 55 | 57.5 | 60 | 55 | 57.5 | 60 | 57.5 |
| C-black[2] |  | 45 | 42.5 | 40 | 20 | 20 | 20 | 20 | 20 | 20 | 20 | 20 | 20 | 20 |
| Graphite[3] | KS150-400** |  |  |  | 25 | 22.5 | 20 |  |  |  |  |  |  |  |
|  | KS5-44** |  |  |  |  |  |  | 25 | 22.5 | 20 |  |  |  |  |
|  | KS6* |  |  |  |  |  |  |  |  |  | 25 | 22.5 | 20 |  |
|  | T15-75** |  |  |  |  |  |  |  |  |  |  |  |  | 22.5 |
| Total | | 100 | 100 | 100 | 100 | 100 | 100 | 100 | 100 | 100 | 100 | 100 | 100 | 100 |
| Properties | unit | | | | | | | | | | | | | |
| Rheology | ml/10 | 5.5 | 9.4 | 12.9 | 22.8 | 25.5 | 29.8 | 19.2 | 22 | 23.6 | 11.8 | 15 | 17.3 | 23.2 |

TABLE 2-continued

| Formulation | | #5 | #6 | #7 | #8 | #9 | #10 | #11 | #12 | #13 | #14 | #15 | #16 | #17 |
|---|---|---|---|---|---|---|---|---|---|---|---|---|---|---|
| MVR (265° C./10 kg) | min | | | | | | | | | | | | | |
| Thermal HDT (0.45 Mpa) | ° C. | | | | | | | | | | | | | |
| Thermal conductivity | W/mK | 0.46 | 0.41 | 0.40 | 0.86 | 0.64 | 0.55 | 0.81 | 0.71 | 0.69 | 0.79 | 0.73 | 0.64 | 0.76 |
| PTC-characteristics | | | | | | | | | | | | | | |
| RT resistivity | Ohm·cm | 0.97 | 1.59 | 2.01 | 29.43 | 45.79 | 169.19 | 3.76 | 6.58 | 9.50 | 2.01 | 2.42 | 3.64 | 8.46 |
| $R_{135}/R_{23}$ | | 533 | 844 | 1153 | 29481 | 7710 | 3564 | 1768 | 2555 | 2770 | 402 | 627 | 1210 | 3907 |
| Trip temperature | ° C. | 127 | 127 | 127 | 123 | 123 | 123 | 125 | 125 | 125 | 126 | 126 | 126 | 123 |

[1]Basell GD7255 was used
[2]Printex G from Degussa
[3]Graphites from Timcal
*KS y means that the d90 is y micron (I.e. 90 wt % of the particles are < as y micron) KS6 means that 90% of the particles are smaller as 6 micron.
**KS x-y or T x-y are sieved fractions from the original KS y or Ty formulations were y indicates the d90 (I.e. 90% of the particles are smaller as y micron). This material was sieved where all particles smaller as x micron were removed. KS150-400 means that an original KS400 (d90 = 400 micron has been sieved and all particles <150 micron are removed.

In regards to Table 2, it may be seen how particle sizes greater than 10 microns enable better properties as compared to particle sizes less than 10 microns and that the best results are seen when the average particle size of the graphite particles includes medium sized particles, although the advantages are also present with larger size particles. In these Examples, the comparative data can be seen in samples 5, 6 and 7 (no graphite) and samples 14, 15 and 16 (using graphite particles with a d90 of 6 microns). As may be seen from the data, samples 8 (large particles) and 11 (medium particles) had an improved thermal conductivity and MVR as compared to sample 14 (small particles). This improvement was also seen in the corresponding groups of samples 9 (large), 12 (medium) and 17 (also medium) as compared to sample 15 (small) and the group of samples 10 (large) and 13 (medium) as compared to sample 16 (small), though in certain instances, only the MVR had improved.

Also, when comparing samples with similar room temperature resistivities, the samples using larger particle sizes had improved thermal conductivity and MVR as compared to the samples using smaller particle sizes (e.g., sample 11 as compared to sample 16).

As such, the data demonstrates an unexpected advantage of using medium and larger size graphite particles to form PTC materials having improved thermal conductivity and MVR as compared to PTC materials using smaller sized graphite particles.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The singular forms "a," "an," and "the" include plural referents unless the context clearly dictates otherwise. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs. The endpoints of all ranges directed to the same property or amount are independently combinable and inclusive of the endpoint.

The invention claimed is:

1. A positive temperature coefficient composition comprising:
   a) from about 30 to about 90% by weight of a semi-crystalline thermoplastic polymer having a degree of crystallinity of at least 5%;
   b) from about 5 to about 50% by weight carbon black; and
   c) from about 5 to about 50% by weight graphite having a carbon content of at least 99% and an average particle size of from 10 microns to 300 microns;
   wherein the positive temperature coefficient composition has an improved thermal conductivity as compared to a composition consisting of the thermoplastic polymer and the carbon black;
   wherein the composition has a room temperature volume resistivity at 23° C. of from 2.01 Ω·cm to 169.19 Ω·cm.

2. The composition of claim 1, wherein the composition comprises from about 40 to about 80% by weight of a thermoplastic polymer; from about 10 to about 50% by weight carbon black; and from about 10 to about 50% by weight graphite.

3. The composition of claim 1, wherein the composition comprises from about 40 to about 65% by weight of a thermoplastic polymer; from about 15 to about 30% by weight carbon black; and from about 20 to about 40% by weight graphite.

4. The composition of claim 1, wherein the composition further comprises at least one additive selected from fillers, antioxidants, lubricants, flame retardants nucleating agents, coupling agents, ultraviolet absorbers, ultraviolet stabilizers, pigments, dyes, agents, plasticizers, processing aids, viscosity control agents, tackifiers, anti-blocking agents, surfactants, extender oils, metal deactivators, voltage stabilizers, boosters, catalysts, smoke suppressants, or combinations thereof.

5. The composition of claim 1, wherein the thermoplastic polymer is selected from polyethylene, polypropylene, polyvinyl acetate, polycaprolactone polyesters, syndiotactic polystyrene (sPS), polyamides, poly-tetra-fluorethylene, polybutylene-terephthalate, polyphenylene-sulfide, high-density polyethylene, linear low-density polyethylene, low-density polyethylene, mid-density polyethylene, polyisobutylene, poly(vinylidene chloride), poly(vinylidene fluoride), polyacrylonitrile, polybutadiene, polyethylene-terephthalate, poly(8-aminocaprylic acid), poly(vinyl alcohol), ethylene-based co- and terpolymers, maleic anhydride modified polyethylene, glycidyl methacrylate modified grafted polyethylene, maleic acid anhydride modified polypropylene, glycidyl methacrylate modified polypropylene, or blends, mixtures or combinations of one or more of these polymers.

6. The composition of claim 1, wherein the carbon black has a dibutylphthalate absorption of less than 250 ml/100 g.

7. The composition of claim 1, wherein the graphite has a particle size between 10 microns and 150 microns.

8. A positive temperature coefficient composition comprising:
   a) from about 30 to about 90% by weight of a semi-crystalline thermoplastic polymer having a degree of crystallinity of at least 5%;
   b) from about 5 to about 50% by weight carbon black; and
   c) from about 5 to about 50% by weight graphite having a carbon content of at least 99% and a d90 particle size of from 10 microns to 400 microns;
   wherein the positive temperature coefficient composition has an improved thermal conductivity as compared to a composition consisting of the thermoplastic polymer and the carbon black;
   wherein the composition has a room temperature volume resistivity at 23° C. of 2.01 Ω·cm to 169.19 Ω·cm.

9. The composition of claim 8, wherein the composition comprises from about 40 to about 80% by weight of a thermoplastic polymer; from about 10 to about 50% by weight carbon black; and from about 10 to about 50% by weight graphite.

10. The composition of claim 8, wherein the composition comprises from about 40 to about 65% by weight of a thermoplastic polymer; from about 15 to about 30% by weight carbon black; and from about 20 to about 40% by weight graphite.

11. The composition of claim 8, wherein the composition further comprises at least one additive selected from fillers, antioxidants, lubricants, flame retardants nucleating agents, coupling agents, ultraviolet absorbers, ultraviolet stabilizers, pigments, dyes, agents, plasticizers, processing aids, viscosity control agents, tackifiers, anti-blocking agents, surfactants, extender oils, metal deactivators, voltage stabilizers, boosters, catalysts, smoke suppressants, or combinations thereof.

12. The composition of claim 8, wherein the thermoplastic polymer is selected from polyethylene, polypropylene, polyvinyl acetate, polycaprolactone polyesters, syndiotactic polystyrene (sPS), polyamides, poly-tetra-fluorethylene, polybutylene-terephthalate, polyphenylene-sulfide, high-density polyethylene, linear low-density polyethylene, low-density polyethylene, mid-density polyethylene, polyisobutylene, poly(vinylidene chloride), poly(vinylidene fluoride), polyacrylonitrile, polybutadiene, polyethylene-terephthalate, poly(8-aminocaprylic acid), poly(vinyl alcohol), ethylene-based co- and terpolymers, maleic anhydride modified polyethylene, glycidyl methacrylate modified grafted polyethylene, maleic acid anhydride modified polypropylene, glycidyl methacrylate modified polypropylene, or blends, mixtures or combinations of one or more of these polymers.

13. The composition of claim 8, wherein the carbon black has a dibutylphthalate absorption of less than 250 ml/100 g.

14. The composition of claim 8, wherein the graphite has a d90 particle size between 10 microns and 150 microns.

15. An article of manufacture comprising the positive temperature coefficient composition of claim 1.

16. An article of manufacture comprising the positive temperature coefficient composition of claim 8.

* * * * *